UNITED STATES PATENT OFFICE.

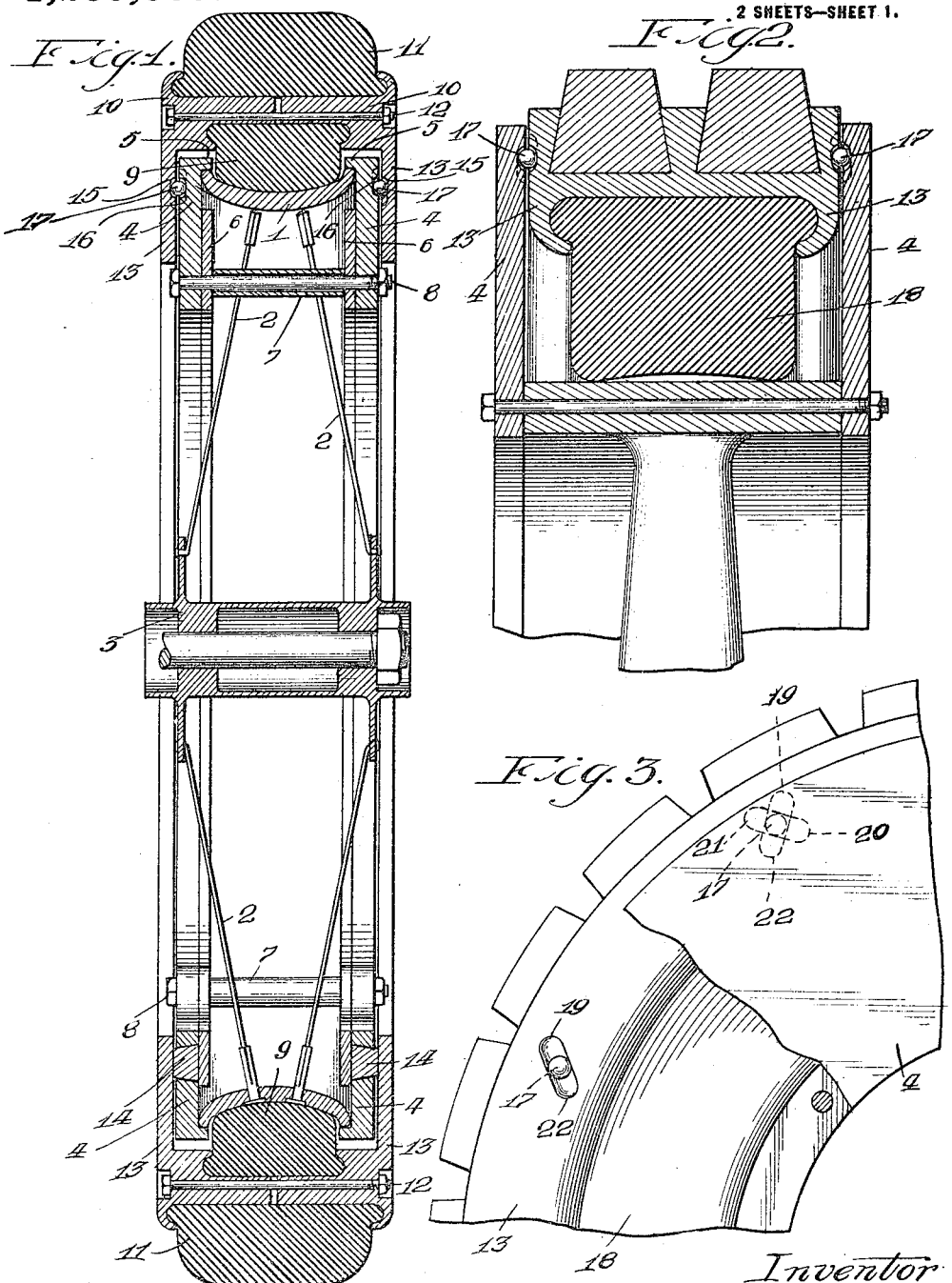

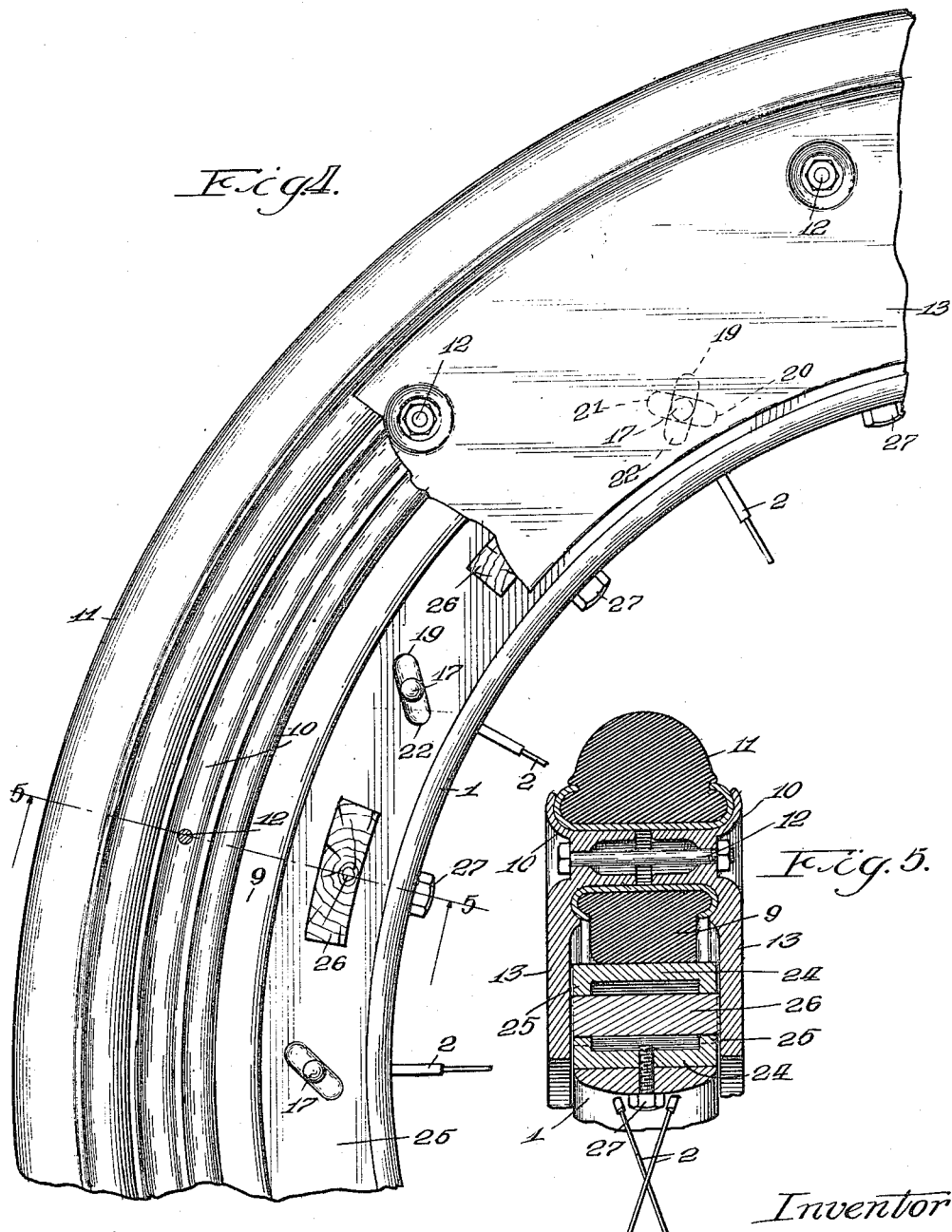

FRANKLIN A. FROMMANN, OF CHICAGO, ILLINOIS.

VEHICLE-WHEEL.

1,259,009.  Specification of Letters Patent.  Patented Mar. 12, 1918.

Application filed April 16, 1913. Serial No. 761,455.

*To all whom it may concern:*

Be it known that I, FRANKLIN A. FROMMANN, citizen of the United States, residing at Chicago, in the county of Cook and State of Illinois, have invented certain new and useful Improvements in Vehicle-Wheels; and I do hereby declare the following to be a full, clear, and exact description of the invention, such as will enable others skilled in the art to which it appertains to make and use the same.

My invention relates to vehicle wheels of the class having a tire member floatingly carried by the hub and spoke member of the wheel, and having cushioning means interposed between the tire member of the wheel and the hub and spoke member thereof. In wheel constructions of this class, it has heretofore been difficult to limit the relative circumferential movement of the tire member with respect to the hub member and, in practice, an excess of such relative movement has resulted in useless friction and wear upon the cushioning means and the wheel parts in engagement therewith.

One object of my invention is to provide a simple and effective means for restricting the said relative circumferential motion of the wheel parts and for governing the relative circumferential positions of the tire and hub according to the compression or distension of the cushioning means, *i. e.* according to the relative radial position of the tire and hub members of the wheel. Another object is to provide simple and easily replaceable means for reducing the friction between the adjacent side flanges of the relatively movable wheel parts. Still another object is to provide means for attaching a floatingly mounted rim to a standard type of wheel as heretofore used with a cushioning tire rigidly mounted thereon, such as the type of wheel commonly used upon motorcycles. Further objects will appear from the accompanying drawings, in which—

Figure —1— is a transverse section through a wheel embodying my invention.

Figs. —2— and —5— are fragmentary sectional views of other embodiments of my invention.

Figs. —3— and —4— are fragmentary side elevations of the wheel of Figs. —2— and —5— respectively.

In the drawings, Fig. 1 shows a motorcycle wheel of standard construction, having a rim 1 carried by spokes 2 mounted upon a hub 3, the said wheel parts being rigidly secured to each other. Laterally engaging the rim 1 are annular side flanges 4 having inwardly directed end portions 5 adapted to hook over the periphery of the rim 1 at its lateral edges. Between the side flanges 4 radially inward of the said rim 1 and adjacent to the respective side flanges are auxiliary annular flanges 6, these being laterally separated by spacer members 7. The latter are preferably tubes slipped over bolts 8, which bolts extend transversely through the flanges 4 and 6, and which bolts hold the flanges 4 in hooking engagement with the rim 1 of the wheel.

Bearing centripetally against the said rim 1 is an annular cushioning member 9, preferably of vulcanized rubber, this member being clampingly mounted between annular tire members 10, which tire members also clamp a radially outwardly directed annular tire or tread member 11, the tire members 10 being maintained in their said clamping relation by bolts 12 extending transversely through the same intermediate of the cushioning member 9 and the tread member 10. Each of the tire members 10 has at its laterally outer edge an annular flange 13 extending radially inward of the wheel adjacent to one of the side flanges 4.

Each of the flanges 4 is provided at intervals with transverse perforations housing anti-friction blocks 14 of wood, Babbitt metal or other suitable materials. These blocks abut at their inner ends against the auxiliary flanges 6 and at their outer ends against the outer side flanges 13, thereby reducing the friction between the relatively slidable pairs of side flanges 13 and 4. Each of the outer side flanges 13 also has upon its inner surface a plurality of grooves or recesses 15, each of which grooves is opposed for portion of its length to a portion of a corresponding groove 16 upon the outer surface of the respectively adjacent side flange 4. Each of the grooves thus opposed to each other is adapted to house a lateral portion of a steel ball or roller 17, the grooves upon each flange being similarly disposed with reference to the periphery thereof. It will be evident from Figs. 3 and 4 that the balls thus housed between the adjacent flanges will control the relative circumferential position of the said flanges, That is, if the cushioning member 18 of Fig. 3 is compressed, the ball 17 will co-act with the grooves housing the same to move the flanges 13 and 4 circumferentially with respect to each other, until the ends 19 and 20 of the said grooves will be opposed to each other laterally of the wheel. Likewise, a distending of the cushioning member will cause the ball 17 to bring the opposite ends 21 and 22 of the grooves directly opposite each other. Consequently, the interposed balls or rollers will control the circumferential position of the tire member of the wheel with respect to the hub member of the wheel according to the relative radial movement of the said members. By suitably designing the angle between the opposed grooves, the ball and groove arrangement can thus be made to limit and counteract the distortion of the cushioning member due to the tendency of the hub of the wheel to lag circumferentially behind the tire member, thereby avoiding a slipping of the radially inward portions of the cushioning member upon the inner rim 1, and also avoiding the friction and wear heretofore produced by such slipping in wheels of this general class.

While I have shown and described the various features of my invention as embodied in wheel parts attached to a standard type of wire spoke wheel, it is obvious that these features could also be applied to other designs of wheels and that they could be altered considerably without departing from the spirit of my invention. For example, Figs. 2 and 3 show a wheel rim equipped with wooden tread blocks and with a ball and groove arrangement close to its periphery. Figs. 4 and 5 show a rim in which the spacer members 24 are united to form annular rings integral with the inner side flanges 25 and in which the anti-friction members 26 extend transversely through the opposite flanges 25, so that the auxiliary flanges of Fig. 1 can be omitted. Likewise, Fig. 5 shows the tubular member comprising the portions 24 and 25 as fastened to the rim 1 by screws 27, so that no transverse bolts, or hook formations upon the inner side flanges, are required.

I claim as my invention:

1. A rim for vehicle wheels having an inner rim rigid with the hub thereof, comprising a pair of side flanges secured to the said inner rim; a second pair of side flanges laterally adjacent respectively to the aforesaid pair and movable radially and circumferentially of the wheel with respect to the aforesaid pair; one of said pairs having transverse perforations therein; a tire and a cushioning member both carried by one of said pairs, the said cushioning member having centripetal engagement with the said inner rim; an auxiliary flange laterally adjacent to each of the said perforated flanges; and rigid anti-friction members positioned in the said perforations of the perforated flanges and abutting at one end against the side flange adjacent thereto, each of the said anti-friction members abutted at its other end against one of the said auxiliary flanges.

2. A rim for a vehicle wheel having an inner rim rigid with the hub thereof, comprising a pair of side flanges clampingly secured to the said inner rim; a second pair of side flanges adjacent respectively to the first named pair of side flanges and movable circumferentially and radially of the wheel with respect to the first named pair of side flanges; a tire and a cushioning member both carried by the said second pair of side flanges, the said cushioning member having centripetal engagement with the said inner rim, there being grooves upon the opposed surfaces of the adjacent side flanges; and rollers housed in the said grooves, the said grooves so disposed that the rollers will coact with the grooves to control the relative circumferential position of the tire and the inner rim.

3. A rim for a vehicle wheel having an inner rim rigid with the hub thereof, comprising a pair of side flanges clampingly secured to the said inner rim; a second pair of side flanges adjacent respectively to the first named pair of side flanges; a tire and a cushioning member both carried by the said second pair of side flanges, the said cushioning member having centripetal engagement with the said inner rim and rollers interposed between the adjacent side flanges, there being grooves upon the said flanges, each groove adapted to house a lateral half of a roller; the grooves housing each roller being disposed angularly of each other, whereby the said grooves and the roller housed by the same will coact to alter the relative circumferential position of the tire and the inner rim upon a compressing or distending of the said cushioning member.

4. A rim for a vehicle wheel having an inner rim rigid with the hub thereof, comprising a pair of side flanges clampingly secured to the said inner rim; a second pair of side flanges adjacent respectively to the first named pair of side flanges; a tire and a cushioning member, both carried by the said second pair of side flanges, the said cushioning member having centripetal engagement with the said inner rim and being adapted to permit relative circumferential movement of the said tire and inner rim; and rollers interposed between the respectively adjacent side flanges, there being grooves upon the said flanges, each groove adapted to house a lateral portion of a roller; the grooves housing each roller being disposed angularly of each other, whereby the said grooves and the rollers housed by the same will coact to alter the relative circumferential position of the tire and inner rim upon a compressing or distending of the said cushioning member.

5. A rim for a vehicle wheel having an inner rim rigid with the hub thereof, comprising a pair of side flanges clampingly secured to the said inner rim; a second pair of side flanges adjacent respectively to the first named pair of side flanges; a tire and a cushioning member, both carried by the said second pair of side flanges, the said cushioning member having centripetal engagement with the said inner rim and being adapted to permit relative radial and circumferential movement of the said tire and inner rim; and rollers interposed between the respectively adjacent side flanges, there being grooves upon the said flanges, each groove adapted to house a lateral portion of a roller; the grooves housing each roller being disposed angularly of each other, whereby the said grooves and the rollers housed by the same will coact to alter the relative circumferential position of the tire and inner rim upon relative radial motion of the said tire and inner rim.

6. A rim for vehicle wheels having an inner rim rigid with the hub thereof, comprising a pair of side flanges secured to the said inner rim; a second pair of side flanges laterally adjacent respectively to the aforesaid pair and movable radially and circumferentially of the wheel with respect to the aforesaid pair; one of said pairs having transverse perforations therein; a tire and a cushioning member both carried by one of said pairs, the said cushioning member having centripetal engagement with the said inner rim; an auxiliary flange laterally adjacent to each of the said perforated flanges; and rigid anti-friction members positioned in the said perforations of the perforated flanges and abutting at one end against the side flange adjacent thereto, each of the said anti-friction members abutted at its other end against one of the said auxiliary flanges; and spacer members adapted to maintain the auxiliary flanges in their abutting relation to the said anti-friction members.

In testimony whereof I have signed my name in presence of two subscribing witnesses.

FRANKLIN A. FROMMANN.

Witnesses:
ALBERT SCHEIBLE,
M. M. BOYLE.

Copies of this patent may be obtained for five cents each, by addressing the "Commissioner of Patents, Washington, D. C."